(12) United States Patent
Underhill

(10) Patent No.: US 11,208,228 B2
(45) Date of Patent: Dec. 28, 2021

(54) NET WRAPPING SYSTEM

(71) Applicant: CNH Industrial America LLC, New Holland, PA (US)

(72) Inventor: Kenneth Underhill, Strasburg, PA (US)

(73) Assignee: CNH INDUSTRIAL AMERICA LLC, New Holland, PA (US)

(*) Notice: Subject to any disclaimer, the term of this patent is extended or adjusted under 35 U.S.C. 154(b) by 634 days.

(21) Appl. No.: 15/210,170

(22) Filed: Jul. 14, 2016

(65) Prior Publication Data

US 2018/0016048 A1    Jan. 18, 2018

(51) Int. Cl.
     *B65B 61/06*      (2006.01)
     *A01F 15/07*      (2006.01)
     *B65B 11/04*      (2006.01)
     *B65B 41/12*      (2006.01)

(52) U.S. Cl.
     CPC .......... *B65B 61/06* (2013.01); *A01F 15/0715* (2013.01); *B65B 11/04* (2013.01); *B65B 41/12* (2013.01)

(58) Field of Classification Search
CPC . A01F 2015/0745; B65B 61/06; B65B 11/04; B65B 41/12
USPC ........................................................ 53/399
See application file for complete search history.

(56) References Cited

U.S. PATENT DOCUMENTS

| | | | |
|---|---|---|---|
| 4,207,983 A | 6/1980 | Wolske | |
| 4,956,968 A * | 9/1990 | Underhill | ............ A01F 15/0715 100/88 |
| 5,020,299 A * | 6/1991 | Underhill | ............ A01F 15/0715 53/399 |
| 5,129,208 A | 7/1992 | Van Zee | |
| 5,140,802 A | 8/1992 | Inman et al. | |
| 5,216,873 A * | 6/1993 | Ratzlaff | .............. A01F 15/0715 53/118 |

(Continued)

FOREIGN PATENT DOCUMENTS

| EP | 0766912 A1 | 4/1997 |
|---|---|---|
| EP | 2959767 A1 | 12/2015 |
| WO | 2016089546 A1 | 6/2016 |

OTHER PUBLICATIONS

European Search Report for European Application No. 17181386.8, dated Dec. 1, 2017 (7 pages).

*Primary Examiner* — Anna K Kinsaul
*Assistant Examiner* — Daniel Jeremy Leeds
(74) *Attorney, Agent, or Firm* — Patrick Sheldrake; Peter Zacharias

(57) ABSTRACT

The disclosure relates to a system and method for wrapping bales in a harvester that uses wrapping material stored in flat, folded layers instead of conventional round tubes or rolls, and specifically to a system for positioning and cutting the wrapping material during and after the process of wrapping a bale, the system comprising: a first feed roll, configured for dispensing a portion of wrapping material from a bundle; a feed plate system, configured to receive wrapping material and capable of applying a first amount of tension to the portion of wrapping material; and at least one cutting knife, positioned between the feed plate system and the bale chamber, such cutting knife independently movable from a first position to a second position; and a wrapping material channel positioned in operable communication with the bundle of wrapping material, the wrapping mechanism and the bale chamber.

12 Claims, 9 Drawing Sheets

(56) References Cited

U.S. PATENT DOCUMENTS

| | | | |
|---|---|---|---|
| 5,259,167 A * | 11/1993 | Underhill | A01F 15/0715 53/118 |
| 5,408,810 A | 4/1995 | Cullen | |
| 5,581,974 A * | 12/1996 | Underhill | A01F 15/0715 53/118 |
| 5,581,976 A * | 12/1996 | Underhill | A01F 15/0715 53/399 |
| 6,021,622 A * | 2/2000 | Underhill | A01F 15/0715 53/118 |
| 6,094,900 A * | 8/2000 | Underhill | A01F 15/07 100/88 |
| 6,145,292 A * | 11/2000 | Underhill | A01F 15/07 56/341 |
| 6,170,246 B1 * | 1/2001 | Underhill | A01F 15/07 56/341 |
| 6,247,291 B1 * | 6/2001 | Underhill | A01F 15/0715 242/598.5 |
| 7,805,912 B2 * | 10/2010 | Viaud | A01F 15/0715 100/6 |
| 8,065,859 B1 | 11/2011 | Wingert | |
| 9,475,598 B2 * | 10/2016 | Roberge | A01F 15/02 |
| 10,375,893 B2 * | 8/2019 | Rosseel | A01F 15/0715 |
| 2006/0242931 A1 * | 11/2006 | Ryse | A01F 15/0715 53/587 |
| 2007/0157556 A1 * | 7/2007 | Feraboli | A01F 15/0715 53/399 |
| 2008/0022649 A1 * | 1/2008 | De Gersem | A01F 15/0715 56/341 |
| 2009/0272072 A1 * | 11/2009 | Paillet | A01F 15/0715 53/118 |
| 2010/0089013 A1 * | 4/2010 | McClure | A01F 15/0715 53/587 |
| 2010/0192516 A1 * | 8/2010 | Olander | A01F 15/0715 53/399 |
| 2011/0179750 A1 * | 7/2011 | Smith | A01F 15/0715 53/399 |
| 2012/0073455 A1 * | 3/2012 | Vandamme | A01F 15/0715 100/35 |
| 2012/0090273 A1 * | 4/2012 | Reijersen Van Buuren | A01F 15/071 53/461 |
| 2012/0233963 A1 * | 9/2012 | Chapon | A01F 15/0715 53/203 |
| 2012/0240517 A1 * | 9/2012 | Chapon | A01F 15/0715 53/203 |
| 2012/0240520 A1 * | 9/2012 | Gresset | A01F 15/0715 53/389.1 |
| 2013/0145724 A1 | 6/2013 | Roberge et al. | |
| 2015/0245563 A1 * | 9/2015 | Heaney | A01F 15/071 53/52 |
| 2016/0113204 A1 * | 4/2016 | Rosseel | A01F 15/0715 53/167 |
| 2017/0001747 A1 * | 1/2017 | Reijersen Van Buuren | B65B 11/04 |
| 2018/0014466 A1 * | 1/2018 | Underhill | A01F 15/071 |
| 2018/0310482 A1 * | 11/2018 | Reijersen Van Buuren | A01F 15/0715 |

\* cited by examiner

NET WRAPPING SYSTEM

FIELD

The present disclosure relates generally to a system for wrapping bales in a harvester that uses wrapping material stored in flat, folded layers instead of conventional round tubes or rolls, and specifically to a system for positioning and cutting the wrapping material during and after the process of wrapping a bale.

BACKGROUND

Agricultural balers have been used for years to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales. When a predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged.

Conventional balers use wrapping material that is stored as cylindrical tubes known as wrapping material rolls. A wrapping material roll is typically mounted on a baler by a mount or arm that is capable of allowing the wrapping material roll to rotate. Wrapping material from the roll is then fed into a mechanism that applies the material to a completed bale, and is then cut to separate the wrapped bale from the rest of the material.

The conventional methods have several drawbacks. First, the wrapping material rolls are heavy, typically over 100 pounds, and are thus difficult to maneuver by an operator. Second, the cylindrical nature of the rolls makes storage of the wrapping material difficult on a baler, limiting the total amount of wrapping material available, and causing more frequent downtime to reload wrapping material. Third, feeding the wrapping material off of the roll requires power, since the inertia of the roll must be overcome to pull wrapping material off of it every time a new bale needs to be wrapped. Therefor what is needed is a wrapping system that overcomes these drawbacks in order to increase baling efficiency.

SUMMARY

The present disclosure relates to a system comprising: a pair of oppositely facing sidewalls attached to a subframe; a bale chamber positioned between the pair of sidewalls; at least one bundle of wrapping material; a wrapping mechanism, a portion of the wrapping mechanism positioned adjacent to, proximate to or between the oppositely facing sidewalls and the wrapping mechanism comprising: a first feed roll, configured for dispensing a portion of wrapping material from a bundle positioned at or proximate to the wrapping mechanism; a feed plate system, configured to receive wrapping material from the feed roll, the feed plate system comprising an upper plate and a lower plate capable of applying a first amount of tension to the portion of wrapping material; and at least one cutting knife, positioned between the feed plate system and the bale chamber, such cutting knife independently movable from a first position to a second position; and a wrapping material channel positioned in operable communication with the bundle of wrapping material, the wrapping mechanism and the bale chamber.

In some embodiments, the bundle of wrapping material is positioned at a distance from the bale chamber and the wrapping mechanism sufficient to allow movement of at least a portion of the wrapping material from the bundle to the bale chamber through the wrapping material channel in a first and second operable mode; wherein, in the first operable mode, the feed plate system is free of operable contact with a portion of wrapping material; and wherein, in the second operable mode, the feed roll rotates within in the wrapping material channel in operable contact with at least a portion of the wrapping material such that at least a portion of the wrapping material is capable of being passed in the wrapping material channel through the feed plate system and into the bale chamber.

In some embodiments, the upper plate is positioned within the wrapping material channel and comprises a serrated edge.

In some embodiments, the at least one feed plate system is independently movable from a first operable position to a second operable position; wherein, in the first operable position, at least a portion of the upper plate of the feed system is positioned within the wrapping material channel such that, if wrapping materials is passed through the channel, the upper plate is capable of applying a first amount of tension to the wrapping material at a line of inflection and/or the upper plate is capable of creating a first angle in the wrapping material at the line of inflection between a trailing section of the wrapping material a leading section of the wrapping material; and in the second operable position, at least a portion of the upper plate of the feed system is positioned within the wrapping material channel such that, if wrapping materials is passed through the channel, the upper plate is capable of applying a second amount of tension to the wrapping material at a line of inflection higher than the first amount of tension and/or the upper plate is capable of creating a second angle in the wrapping material at the line of inflection between the trailing section and the leading section that is more acute than the first angle.

In some embodiments, the feed plate system is independently movable from the first operable condition to the second operable condition through rotation along an axis of rotation.

In some embodiments, in the first operable condition, the upper plate rotates upward around the axis of rotation such that the upper plate applies a first amount of tension to the wrapping material at an angle between the leading edge and the trailing edge that is less than about 70 degrees; and in the second operable condition, the upper plate rotates downward around the axis of rotation such that the upper plate applies a second amount of tension to the wrapping material less than the first amount of tension and at an angle between the leading edge and the trailing edge that is greater than or about 70 degrees.

In some embodiments, the first position of the cutting knife is outside of the wrapping material channel; and wherein the second position of the cutting knife is within the wrapping material channel and capable of establishing contact between one or a plurality of points on its blade and the wrapping material.

In some embodiments, the first and second operable mode, the first and second operable position, and the first and second operable condition are capable of synchronous movement, such that when the system is in the second operable mode and the second operable position and/or the second condition, the at least a first cutting knife applies a force sufficient enough to cut the wrapping material.

In some embodiments, the wrapping material bundle comprises one or a plurality of sheets of wrapping material, wherein each sheet is positioned in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that horizontally and vertically aligned and each folded edge of the portion are on alternating sides of the vertically stacked portion.

The present disclosure also relates to a harvester comprising: a pair of oppositely facing sidewalls attached to a subframe; a bale chamber positioned between the pair of sidewalls; at least one bundle of wrapping material; a wrapping mechanism, a portion of the wrapping mechanism positioned adjacent to, proximate to or between the oppositely facing sidewalls and the wrapping mechanism comprising: a first feed roll, configured for dispensing a portion of wrapping material from a bundle positioned at or proximate to the wrapping mechanism; a feed plate system, configured to receive wrapping material from the feed roll, the feed plate system comprising an upper plate and a lower plate capable of applying a first amount of tension to the portion of wrapping material; and at least one cutting knife, positioned between the feed plate system and the bale chamber, such cutting knife independently movable from a first position to a second position; and a wrapping material channel positioned in operable communication with the bundle of wrapping material, the wrapping mechanism and the bale chamber.

In some embodiments, the wrapping mechanism further comprises: a material support tray, capable of supporting the at least one wrapping material bundle; at least one feed roll, operably connected to the material support tray and configured for dispensing wrapping material from the at least one wrapping material bundle; and at least one tensioner, positioned in the material support tray and in operable contact with the at least one wrapping material bundle, capable of providing at least a first tension to the wrapping material.

In some embodiments, the material support tray comprises a pair of support frame walls, a rear wall, a front wall, and a bottom floor, and wherein the pair of support frame walls, the rear wall, the front wall, and the bottom floor define a storage volume of supporting one or more wrapping material bundles stacked vertically on each other.

In some embodiments, the wrapping material bundle comprises one or a plurality of sheets of wrapping material, wherein each sheet is positioned in the material support tray in vertically stacked portions; and wherein each vertically stacked portion of the wrapping material comprises a folded edge defining the edge of the material connecting one portion of the sheet to at least one other sequential portion of the sheet, such that the each vertically stacked portion of the sheet comprises edges that horizontally and vertically aligned and each folded edge of the portion are on alternating sides of the vertically stacked portion.

The present disclosure also relates to a method of dispensing wrapping material in the harvester of claim 10, wherein the method comprises: (a) dispensing wrapping material from at least one wrapping material bundle in to the wrapping material channel, through an upper and lower plate of the feed plate system, and over at least one cutting knife; (b) moving the at least one cutting knife into the wrapping material channel; and (c) moving the feed plate system from a first position to a second position, such that, in the first position the feed plate system applies a first amount of tension; and, in the second position the feed plate system applies a second amount of tension greater than the first and sufficient for the cutting knife to cut the wrapping material.

DETAILED DESCRIPTION OF THE DISCLOSURE

Figure 1:
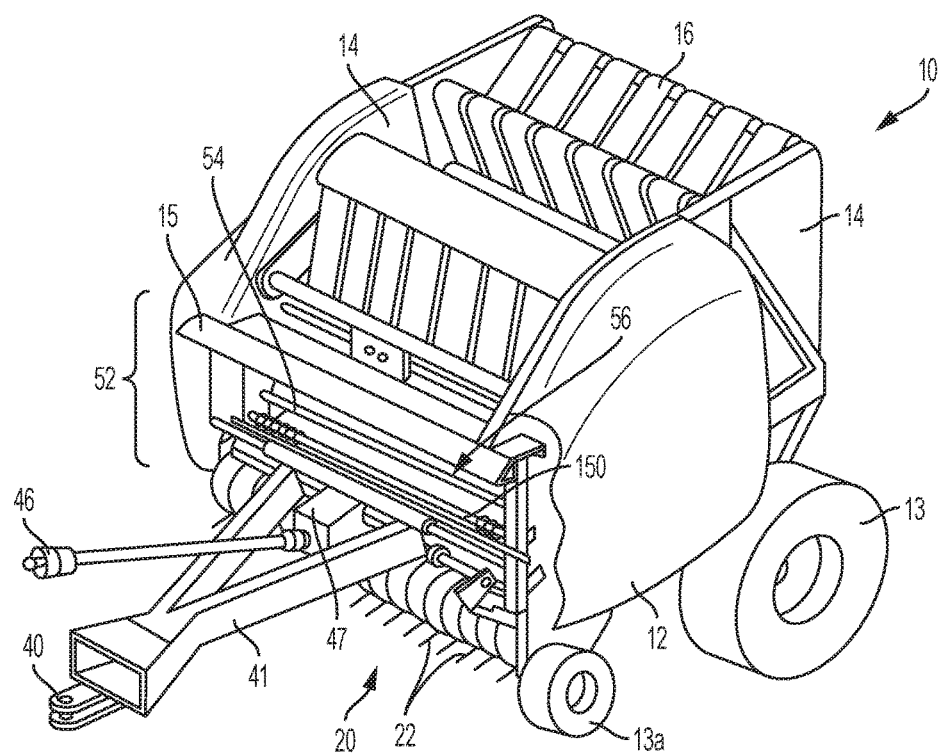
FIG. 1 depicts a static image of a conventional baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, cotton harvester or a combine comprising a baling mechanism. In some embodiments, the harvester is a round baler.

The term "crop material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "wrapping mechanism" as used herein is defined as a mechanical device or assembly that uses wrapping material to wrap a formed bale.

The term "wrapping material" as used herein is defined as a net, mesh, twine, plastic film, or other material that is used for the wrapping of a bale in order to maintain the shape and density of said bale and optionally protect it from weather or other external conditions. Wrapping material can be stored in various ways. In some embodiments, wrapping material can be stored in cylindrical rolls, wherein the wrapping material is wrapped around a central core or tube. In some embodiments, wrapping material can be stored as a folded stack or bundle, with oppositely facing folds. In some embodiments, wrapping material stored as a folded bundle comprises one or a plurality of sheets of wrapping material stacked in vertically stacked portions. In some embodiments, each vertically stacked portion of the wrapping material in a wrapping material bundle comprises a folded edge defining the edge of the material connecting one portion of the sheet to at least one other sequential portion of the sheet, such that the each vertically stacked portion of the sheet comprises edges that are horizontally and vertically aligned and each folded edge of the portion are on alternating sides of the vertically stacked portion. In some embodiments, a wrapping material bundle can consist of one continuously folded wrapping material section. In some embodiments, a wrapping material bundle can consist of two or more operably connected sheets of wrapping material.

The term "cutting implement" or "cutting knife" as used herein is defined as a device involved with the cutting of wrapping material, including one or a plurality of knives, blades, teeth, gears, grinders, scissors, or rotors.

The term "pre-determined size" as used herein is defined as a value which is determined, set, or calculated before the completion of a bale forming cycle, such that, when a bale forming in a bale chamber reaches the value, an event occurs. For example, if the pre-determined size is a specified bale diameter, a harvester may begin a bale wrapping and ejection cycle when bale sensors determine that the forming bale has reached the specified diameter. In some embodiments, the pre-determined size is determined prior to the start of a bale forming cycle. In some embodiments, the pre-determined size is a parameter of diameter, weight, density, moisture content, or position. In some embodiments, the determination of whether a bale has reached the pre-determined size is within the error range of the sensors and controllers involved in the determination. In some embodiments, the determination of whether a bale has reached the pre-determined size is within ±10% of the pre-determined size value. In some embodiments, an operator determines the pre-determined size values. In some embodiments, a controller or other software program determines the pre-determined size values. In some embodiments, an operator provides the pre-determined size values via an operator interface that is in electronic communication with one or more controllers. In some embodiments, a combination of an operator and a controller or other software program determines the pre-determined size values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 9,084,394, 8,771,308, 8,733,241, 8,413,414, 8,291,687, 6,877,304; 6,688,092; 6,644,006 and 6,295,797, 5,136,831 and U.S. patent publication Ser. Nos. 14/316,209, and 14/316,162 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to a wrapping system that uses flat, folded stacks, or bundles, of wrapping material instead of cylindrical tubes of wrapping material. Wrapping material bundles are stored in a wrapping material tray, which is attached to a subframe of a harvester. Wrapping material from the wrapping material bundle is fed out of the wrapping material tray by a feed roll, past at least one guide roll, and into a feed plate, where the wrapping material can be then applied to a completed bale in a bale chamber. The feed plate is capable of movement, such that the feed plate is capable of applying tension to the wrapping material as it passes through the feed plate. In some embodiments, an edge of the feed plate is serrated to assist in applying tension to the wrapping material. The wrapping system also comprises at least one cutting knife, positioned between the feed plate and the bale chamber, designed to cut the wrapping material after the wrapping of the bale is completed. In some embodiments, the cutting knife is capable of movement into and out of a cutting position.

In some embodiments, the wrapping system comprises: a pair of oppositely facing sidewalls attached to a subframe; a bale chamber positioned between the pair of sidewalls; at least one bundle of wrapping material; a wrapping mechanism, a portion of the wrapping mechanism positioned adjacent to, proximate to or between the oppositely facing sidewalls and the wrapping mechanism comprising: a first feed roll, configured for dispensing a portion of wrapping material from a bundle positioned at or proximate to the wrapping mechanism; a feed plate system, configured to receive wrapping material from the feed roll, the feed plate system comprising an upper plate and a lower plate capable of applying a first amount of tension to the portion of wrapping material; and at least one cutting knife, positioned between the feed plate system and the bale chamber, such cutting knife independently movable from a first position to a second position; and a wrapping material channel positioned in operable communication with the bundle of wrapping material, the wrapping mechanism and the bale chamber.

Referring to the figures, FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 2:
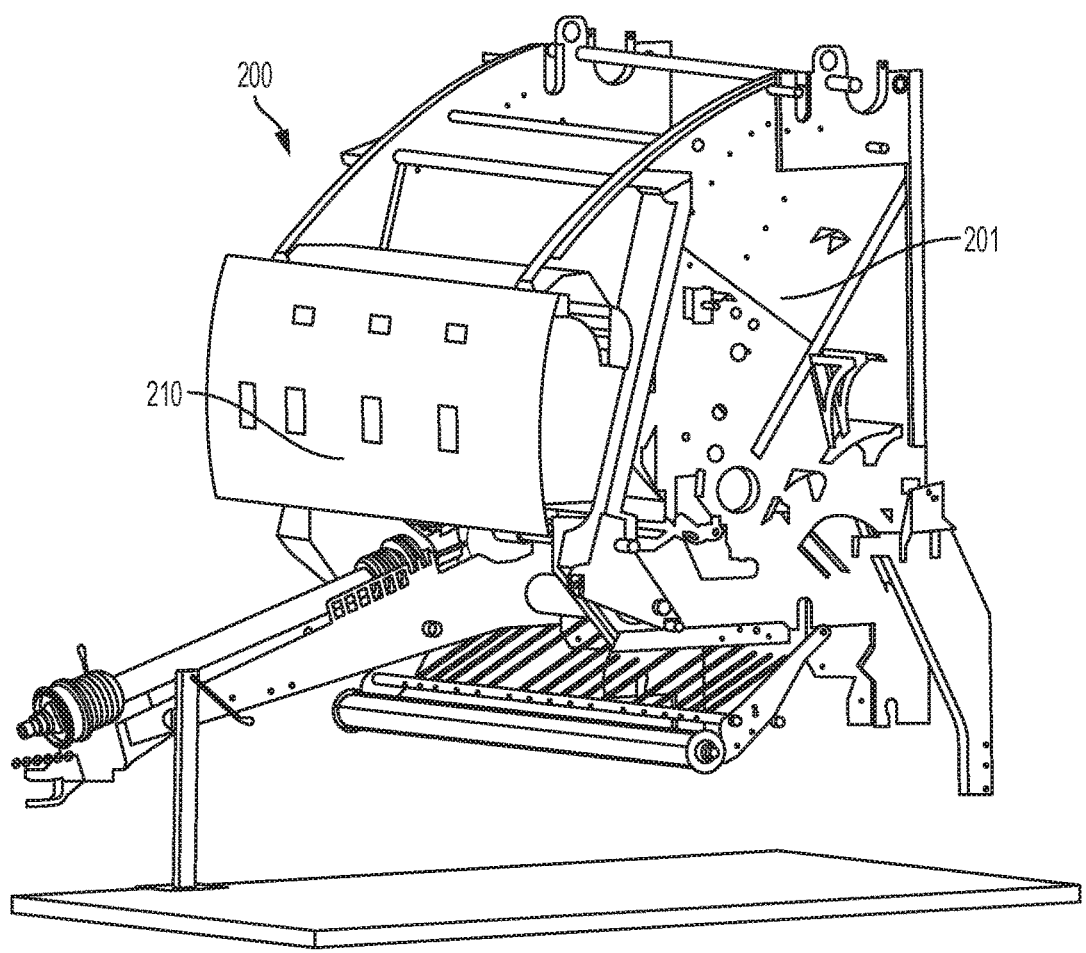
FIGS. 2 and 3 depict images of a harvester designed to use flat bundles of wrapping material in various positions.
Figure 3:
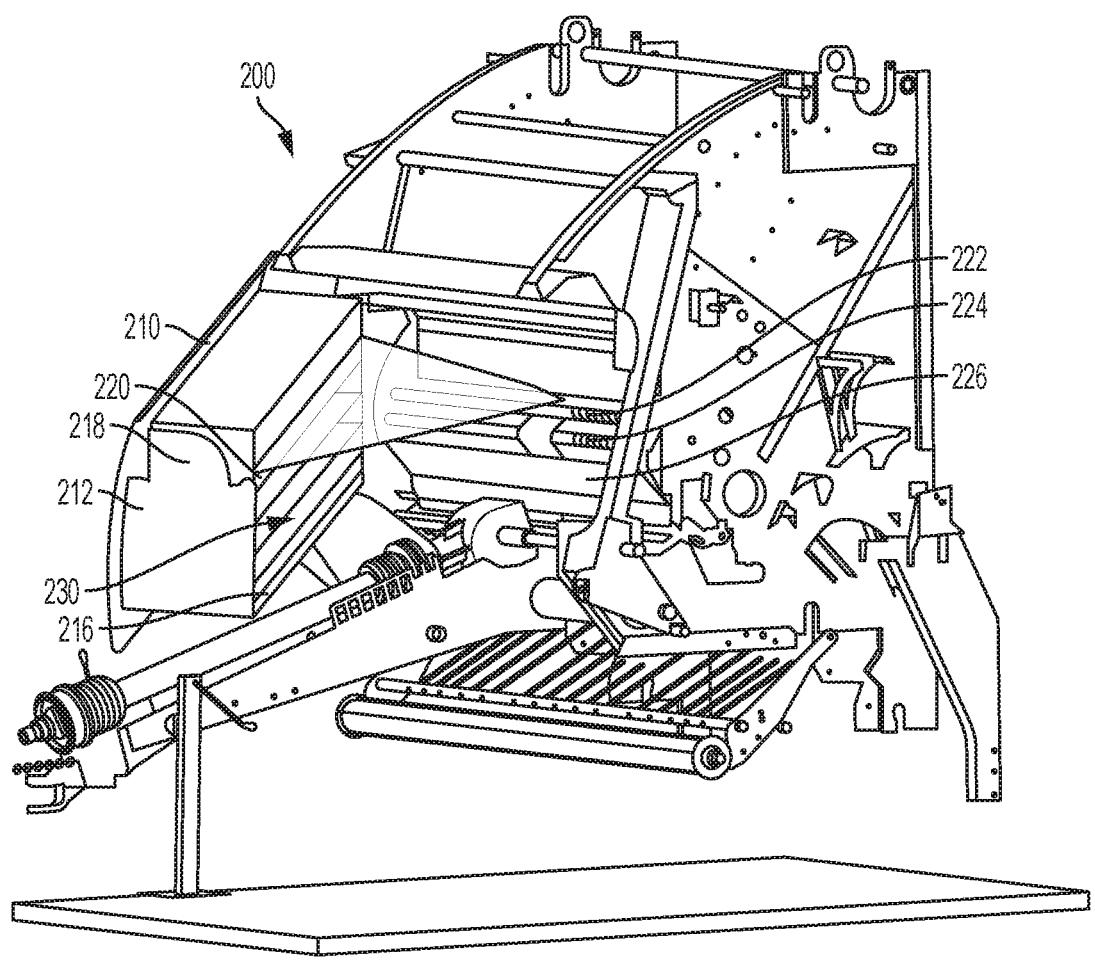

FIGS. 2 and 3 depict a harvester designed to use flat, folded wrapping material bundles instead of wrapping material rolls. In FIG. 2 the harvester, generally 200, is positioned with the wrapping material tray 210 closed. The wrapping material tray 210 is attached to the subframe 201 of the harvester 200 by a hinge (not shown). In FIG. 3 the wrapping material tray 210 is opened, the wrapping material tray 210 comprises two side walls (one of which 212 is shown), and a bottom floor 216, and at least one feed roll 220. Wrapping material bundles, collectively 230, are placed in the wrapping material tray 210. In some embodiments, even more wrapping material, such as additional bundles or twine, can be stored in the upper tray 218. Wrapping material from the top-most wrapping material bundle 230 is fed out of the wrapping material tray 210 by the feed roll 220. The wrapping material is then fed through two guide rolls 222 and 224 before being fed into a feed plate 226. In some embodiments, the feed plate 226 consists of an upper plate and a lower plate. In some embodiments, the feed plate 226 feeds the wrapping material into the bale chamber of the harvester. As shown in FIG. 3, wrapping material is dispensed from the top of the upper wrapping material bundle 230. In some embodiments, the wrapping material is dispensed from the top to the bottom of the wrapping material tray 210. In some embodiments, the wrapping material of the various wrapping material bundles stored in the wrapping material tray 210 are connected, such that the wrapping material continues to be fed into the harvester as one wrapping material bundle ends and the next begins.

Figure 4:
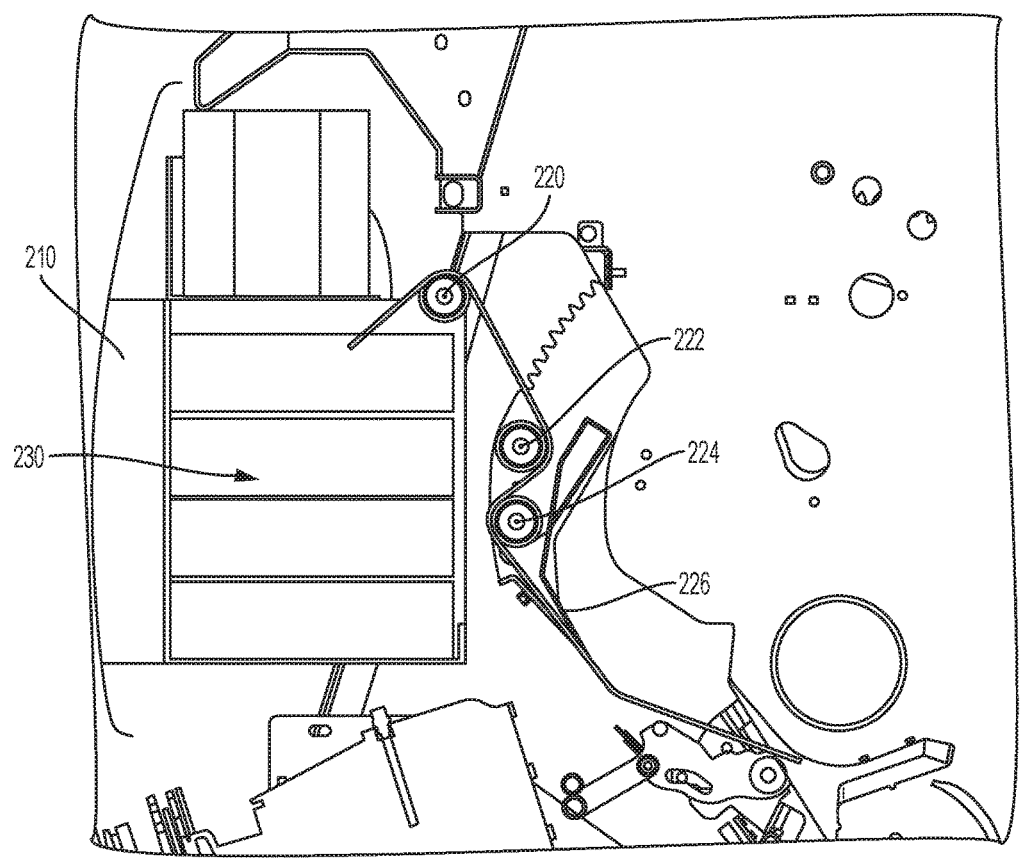
FIG. 4 depicts a cross section diagram of a wrapping mechanism with flat bundles of wrapping material.

FIG. 4 depicts a cross-section diagram of the wrapping system and harvester. The wrapping material tray 210 is closed and loaded with four bundles of wrapping material, collectively 230. Wrapping material from the upper wrapping material bundle 220 is fed out of the wrapping material tray 210 by the feed roll 220. The wrapping material continues around two guide rolls 222 and 224 and into a feed plate 226. As the wrapping material exits the feed plate it can be applied to a bale (not shown) in the bale chamber. When a bale is finished being wrapped, a knife (not shown) will cut the wrapping material.

Figure 5:
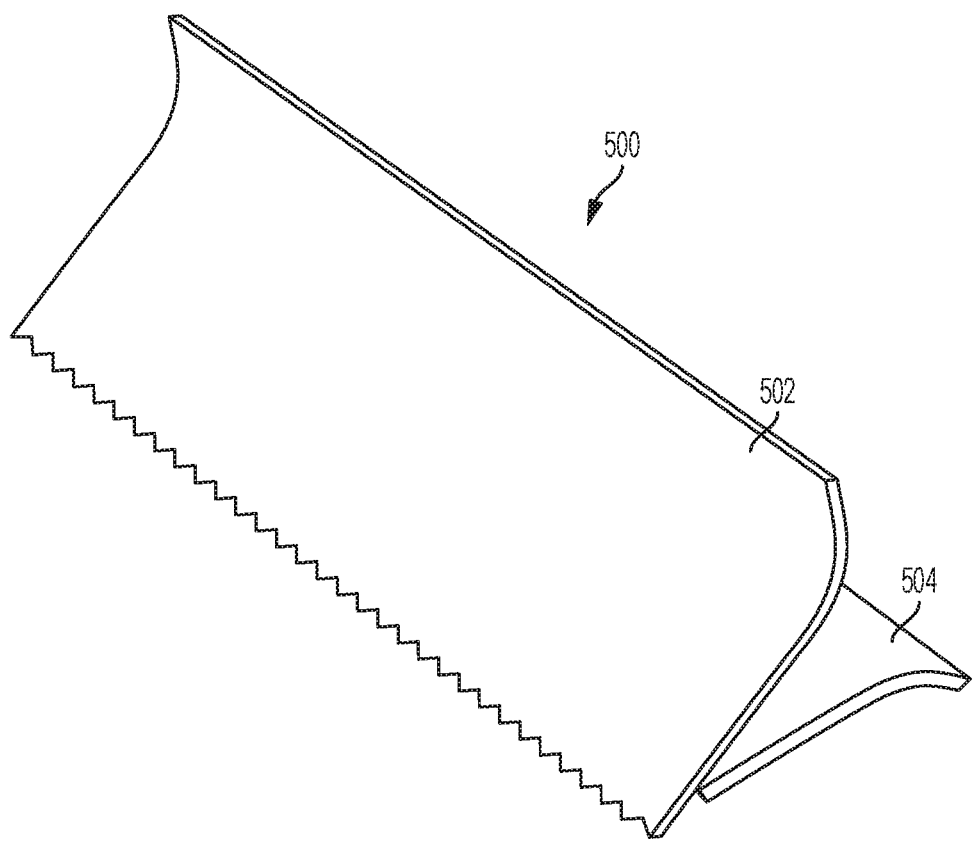
FIG. 5 depicts an image of a feed plate with a serrated edge.

FIG. 5 depicts a close-up view of a feed plate 500, comprising an upper plate 502, and a lower plate 504. Wrapping material (not shown) passes through the wide opening between the plates on the right hand side of the figure and through the narrow opening between the plates towards the left side of the figure. As shown in FIG. 5, the edge of the upper plate 502 is serrated. The serrations can interact with wrapping material, for example a net mesh, such that at certain angles the wrapping material interacts with the serrations, increase the tension of the wrapping material as it exits the feed plate 500. Any of the wrapping systems disclosed herein can work with both a feed plate that has serrations and a feed plate that does not have serrations.

FIGS. 6, 7, 8, and 9 depict the function of the feed plate and cutting knife during and after the wrapping of a bale. It is understood that the components may function in a serial, stepwise, or simultaneous fashion, but that all steps described in FIGS. 6, 7, 8, and 9 illustrate one embodiments for the purposes of the disclosure.

Figure 6:
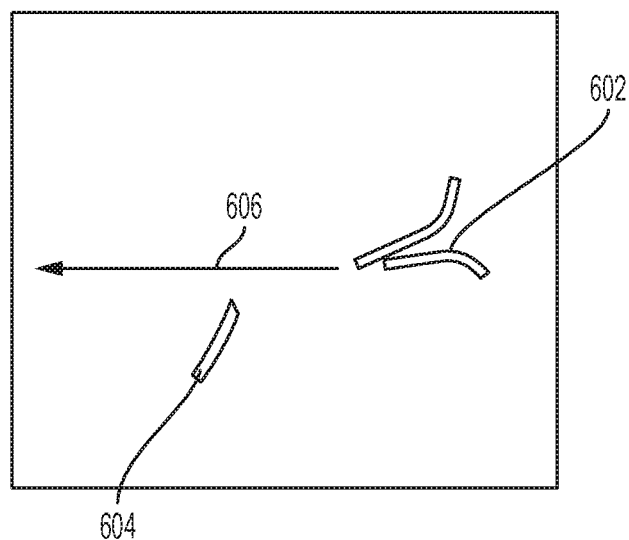
FIGS. 6-9 depicts images the positions of the wrapping material, the feed plate, and the cutting knife during the processes of feeding and cutting the wrapping material.

In FIG. 6 the feed plate 602 is in an upward position and the cutting knife 604 is in a downward position. The wrapping material 606 is passing through feed plate 602 and into a bale chamber (not shown). In some embodiments, the wrapping material 606 is actively wrapping a bale in the bale chamber in FIG. 6.

Figure 7:
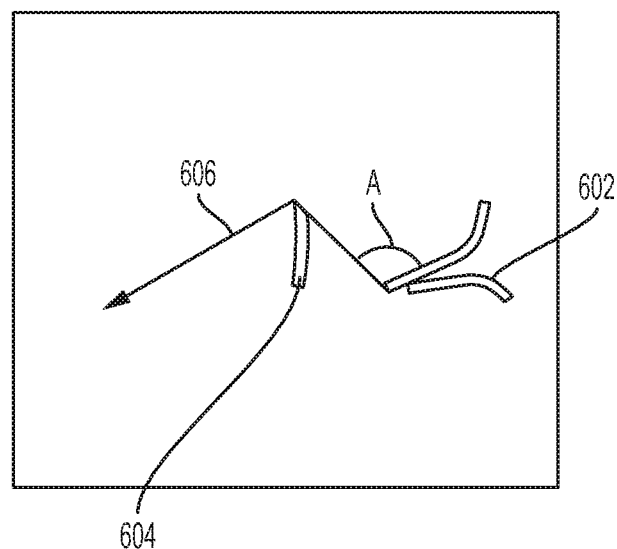

In FIG. 7, the wrapping of the bale is nearing completion, and the cutting knife 604 moves to its upward position. In some embodiments, the cutting knife 604 in its upward position blocks the direct line of the wrapping material 606 from the exit of the feed plate 602 to the entrance of the bale chamber, such that the wrapping material 606 passes over the cutting knife 604, but critically is not cut by it because the wrapping material 606 is under little or no tension. In some embodiments, the angle A of the wrapping material 606 exiting the feed plate 602 is 70 degrees or less.

Figure 8:
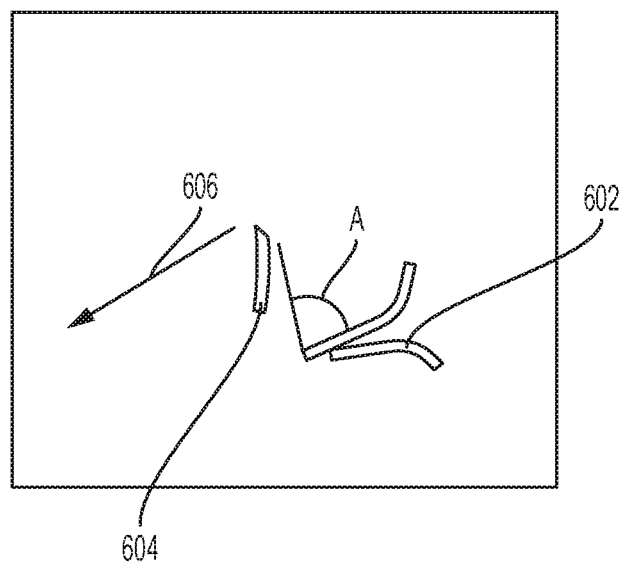

In FIG. 8, the wrapping of the bale is finished, and the wrapping material 606 is cut. The cutting knife 604 remains in its upward position, and the feed plate 602 moves to a downward position. In some embodiments, the feed plate 602 pivots downward, lowering the point at which the wrapping material 606 exits the feed plate 602. In some embodiments, the feed plate 602 moves downward, for example, by being pushed or slid, lowering the point at which the wrapping material 606 exits the feed plate 602. In some embodiments, the angle A of the wrapping material 606 exiting the feed plate is more than 70 degrees. As the angle A of the wrapping material 606 increases, a tension is applied to the wrapping material 606 such that the cutting knife 604 cuts the wrapping material 606. In some embodiments, the precise angle at which the wrapping material 606 is cut depends on several factors, including but not limited to, the type of wrapping material used, whether or not the leading edge of the feed plate 602 is serrated or not, and the sharpness of the cutting knife 604.

Figure 9:
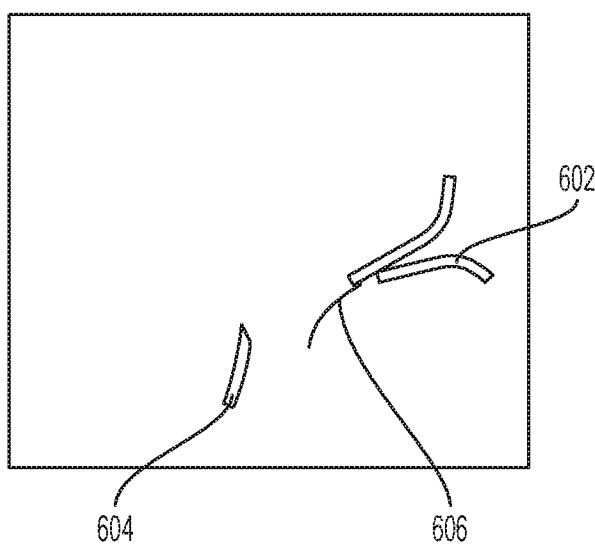

In FIG. 9, the system resets, and the feed plate 602 moves to its upward position and the cutting knife 604 moves to its downward position. The wrapping material 606 is ready to wrap the next bale.

In some embodiments, the disclosure relates to a method comprising: (a) dispensing wrapping material from at least one wrapping material bundle in to the wrapping material channel, through an upper and lower plate of the feed plate system, and over at least one cutting knife; (b) moving the at least one cutting knife into the wrapping material channel; and (c) moving the feed plate system from a first position to a second position, such that, in the first position the feed plate system applies a first amount of tension; and, in the second position the feed plate system applies a second amount of tension greater than the first and sufficient for the cutting knife to cut the wrapping material.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A harvester comprising:
   a bale chamber attached to a subframe;
   a primary wrapping material tray movably connected to the subframe forward of the bale chamber, the wrapping material tray supporting at least one bundle of wrapping material; the bundle of wrapping material comprising a plurality of stacked sheets of wrapping material , wherein the bottom surface of the plurality sheets is in contact with the floor of the tray and the plurality of stacked sheets are connected by folded side edges,
   a wrapping mechanism, a portion of the wrapping mechanism positioned between the wrapping material tray and the bale chamber for receiving wrapping material fed from the wrapping material tray, and the wrapping mechanism comprising:
      a first feed roller, configured for dispensing a portion of wrapping material from the at least one bundle of wrapping material positioned at or proximate to the wrapping mechanism;
      a feed plate assembly, configured to receive wrapping material from the feed roller, the feed plate assembly comprising an upper plate and a lower plate, the feed plate assembly capable of applying varying amounts of tension to the portion of wrapping material; and
      at least one cutting knife, positioned between the feed plate assembly and the bale chamber, the cutting knife independently movable from a first position to a second position; and
   a wrapping material channel positioned in operable communication with the at least one bundle of wrapping material, the wrapping mechanism and the bale chamber; wherein,
   the cutting knife when in the second position, being in contact with the portion of wrapping material, the cutting knife blocking a direct line of the wrapping material from the exit of the feed plate assembly to an entrance of the bale chamber while the wrapping material passes over the cutting knife; and
   the feed plate assembly is moved to increase tension when the cutting knife is in the second position to effect cutting the wrapping material with the cutting knife, the wrapping material forming an angle with the upper plate while the upper plate applies tension to the wrapping material, the angle being less than or about 70 degrees when the tension on the wrapping material causes the wrapping material to be cut by the cutting knife, thereafter the angle is increased.

2. The harvester according to claim 1, wherein the at least one bundle of wrapping material is positioned at a distance from the bale chamber and the wrapping mechanism allowing movement of at least a portion of the wrapping material from the bundle to the bale chamber through the wrapping material channel in a first and second operable mode;
   wherein, in the first operable mode, the feed plate assembly is free of operable contact with a portion of wrapping material; and
   wherein, in the second operable mode,
      the feed roller is located above the primarily wrapping material tray and rotates within the wrapping material channel in operable contact with the at least a portion of the wrapping material, such that the at least a portion of the wrapping material is passed in the wrapping material channel through the feed plate assembly and into the bale chamber.

3. The harvester according to claim 1, wherein the upper plate is positioned within the wrapping material channel and comprises a serrated edge, the serrated edge configured such that at certain angles when the wrapping material interacts with the serrated edge the tension of the wrapping material is increased as it exits the feed plate.

4. The harvester according to claim 2, wherein the feed plate assembly is movable from a first operable position to a second operable position; wherein, in the first operable position, at least a portion of the upper plate of the feed plate assembly is positioned within the wrapping material channel such that, if wrapping materials is passed through the channel, the upper plate applies a first amount of tension to the wrapping material at a line of inflection, the upper plate creating a first angle in the wrapping material at the line of inflection between a trailing section of the wrapping material and a leading section of the wrapping material; and in the second operable position, at least a portion of the upper plate of the feed plate assembly is positioned within the wrapping material channel such that, if wrapping materials is passed through the channel, the upper plate applies a second amount of tension to the wrapping material at a line of inflection higher than the first amount of tension, the upper plate creating a second angle in the wrapping material at the line of inflection between the trailing section and the leading section that is more acute than the first angle.

5. The harvester according to claim 4, wherein the feed plate assembly is movable from the first operable condition to the second operable condition through rotation along an axis of rotation.

6. The harvester according to claim 5, wherein:

in the first operable condition, the upper plate rotates upward around the axis of rotation, the upper plate applies a first amount of tension to the wrapping material at an angle, the angle defined between a leading edge of the feed plate assembly and the portion of the wrapping material between the leading edge and the cutting knife, the angle is less than about 70 degrees; and in the second operable condition, the upper plate rotates downward around the axis of rotation, the upper plate applies a second amount of tension to the wrapping material less than the first amount of tension and at the angle is greater than or about 70 degrees.

7. The harvester according to claim 6, wherein the first and second operable mode, the first and second operable position, and the first and second operable condition are capable of synchronous movement, such that when the feed plate assembly is in the second operable mode and the second operable position and the second condition, the at least a one cutting knife applies a force sufficient enough to cut the wrapping material.

8. A method of dispensing wrapping material in the harvester of claim 1, wherein the method comprises:

(a) dispensing wrapping material from the at least one wrapping material bundle in to the wrapping material channel, through the upper and lower plates of the feed plate assembly, and over the at least one cutting knife, the at least one cutting knife being in the first position outside of the wrapping material channel;

(b) moving the at least one cutting knife into the second position and into the wrapping material channel, the at least one cutting knife contacting the wrapping material, the feed plate assembly being positioned in a first operable position such that the feed plate assembly applies a first amount of tension to the wrapping material between the at least one cutting knife and the feed plate assembly thereby drawing the portion of wrapping material against the cutting knife; and (c) moving the feed plate assembly from the first operable position to a second operable position, the feed plate assembly in the second operable position applying a second amount of tension to the portion of wrapping material between the at least one cutting knife and the feed plate assembly greater than the first amount of tension, thereby further drawing the portion of wrapping material against the cutting knife, to effect cutting and sufficient for the cutting knife to cut the wrapping material.

9. The method of claim 8, wherein the feed plate assembly is independently movable from the first operable position to the second operable position; wherein, in the first operable position, at least a portion of the upper plate of the feed plate assembly is positioned within the wrapping material channel such that, if wrapping materials is passed through the channel, the upper plate applying a first amount of tension to the wrapping material at a line of inflection, the upper plate creating a first angle in the wrapping material at the line of inflection between a trailing section of the wrapping material and a leading section of the wrapping material; and in the second operable position, at least a portion of the upper plate of the feed plate assembly is positioned within the wrapping material channel such that, if the wrapping material is passed through the channel, the upper plate applying a second amount of tension to the wrapping material at a line of inflection higher than the first amount of tension, the upper plate creating a second angle in the wrapping material at the line of inflection between the trailing section and the leading section that is more acute than the first angle.

10. The method of claim 9, wherein in the first operable position, rotating the upper plate rotates upward around the axis of rotation, the upper plate applying a first amount of tension to the wrapping material at an angle, the angle defined between the leading edge of the feed plate assembly and the portion of the wrapping material between the leading edge and the cutting knife, the angle is less than about 70 degrees; and in the second operable position, rotating the upper plate downward around the axis of rotation, the upper plate applying a second amount of tension to the wrapping material less than the first amount of tension and at an the angle is greater than or about 70 degrees.

11. The harvester according to claim 1, wherein the increasing of the angle is to greater than 70 degrees.

12. The harvester according to claim 1, wherein the first position of the cutting knife is a downward position, and the second position is an upward position blocking the direct line of the wrapping material from the exit of the feed plate assembly to the bale chamber such that the wrapping material passes over the at least one cutting knife, and wherein when the cutting knife is in the second position in contact with material, the feed plate assembly is capable of applying varying amounts of tension to the wrapping material by decreasing the angle of the wrapping material exiting the feed plate assembly such that the wrapping material is cut.

* * * * *